United States Patent
Bonev et al.

(10) Patent No.: US 10,572,749 B1
(45) Date of Patent: Feb. 25, 2020

(54) SYSTEMS AND METHODS FOR DETECTING AND MANAGING FINGERPRINT SENSOR ARTIFACTS

(71) Applicant: Synaptics Incorporated, San Jose, CA (US)

(72) Inventors: Boyan Ivanov Bonev, San Jose, CA (US); Adam L. Schwartz, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 185 days.

(21) Appl. No.: 15/921,325

(22) Filed: Mar. 14, 2018

(51) Int. Cl.
  *G06K 9/03* (2006.01)
  *G06K 9/46* (2006.01)
  *G06K 9/00* (2006.01)

(52) U.S. Cl.
  CPC ............. *G06K 9/03* (2013.01); *G06K 9/0004* (2013.01); *G06K 9/4661* (2013.01)

(58) Field of Classification Search
  None
  See application file for complete search history.

(56) References Cited

U.S. PATENT DOCUMENTS

| | | | |
|---|---|---|---|
| 7,623,162 B2 * | 11/2009 | Inaba | H04N 5/361 348/241 |
| 7,912,255 B2 | 3/2011 | Rahmes et al. | |
| 8,908,065 B2 * | 12/2014 | Oike | H04N 5/3591 348/222.1 |
| 8,948,538 B2 * | 2/2015 | Lin | G06T 5/005 382/275 |
| 9,342,731 B1 * | 5/2016 | Khan | G06K 9/00067 |
| 2010/0232659 A1 | 9/2010 | Rahmes et al. | |
| 2013/0051636 A1 * | 2/2013 | Hara | G06T 5/003 382/124 |
| 2014/0020090 A1 * | 1/2014 | Nada | G06K 9/036 726/19 |

(Continued)

FOREIGN PATENT DOCUMENTS

| CN | 101416485 A | * | 4/2009 |
|---|---|---|---|
| CN | 106485237 A | * | 3/2017 |

(Continued)

OTHER PUBLICATIONS

Stone, David B., et al. "Automatic removal of physiological artifacts in Eeg: the optimized fingerprint method for sports science applications." Frontiers in human neuroscience 12 (2018): 96. (Year: 2018).*

(Continued)

*Primary Examiner* — Andrae S Allison
(74) *Attorney, Agent, or Firm* — Leydig, Voit & Mayer, Ltd.

(57) ABSTRACT

Systems and methods for identifying and managing fixed sensor artifacts, such as scratches and non-operational sensor pixels, in a biometric sensor. A plurality of images acquired by the biometric sensor in response to detection of a biometric object proximal to a sensing surface of the biometric sensor are processed to determine a pixel value for each pixel location in each image. One or more specific pixel locations having substantially the same pixel value in the plurality of images are identified an artifact pattern of the biometric sensor.

26 Claims, 12 Drawing Sheets

(56) References Cited

U.S. PATENT DOCUMENTS

| | | | | |
|---|---|---|---|---|
| 2014/0093146 A1* | 4/2014 | Inanc | ................ | G06K 9/00073 |
| | | | | 382/125 |
| 2014/0133711 A1* | 5/2014 | Abe | ...................... | G06K 9/036 |
| | | | | 382/115 |
| 2014/0294250 A1* | 10/2014 | Aoki | ...................... | G06F 21/32 |
| | | | | 382/115 |
| 2015/0286855 A1* | 10/2015 | Neskovic | ........... | G06K 9/00073 |
| | | | | 382/125 |
| 2015/0379348 A1* | 12/2015 | Whritenor | .......... | G06K 9/00597 |
| | | | | 382/117 |
| 2019/0172180 A1* | 6/2019 | Ganesan | ................ | G06T 5/002 |
| 2019/0188442 A1* | 6/2019 | Flament | ............. | G06K 9/00033 |

FOREIGN PATENT DOCUMENTS

| | | | | |
|---|---|---|---|---|
| CN | 109389071 A | * | 2/2019 | |
| JP | 2003256820 A | * | 9/2003 | |

OTHER PUBLICATIONS

Xudong Jiang and W. Ser, "Online fingerprint template improvement," in IEEE Transactions on Pattern Analysis and Machine Intelligence, vol. 24, No. 8, pp. 1121-1126, Aug. 2002. (Year: 2002).*

Zhou, Changyin, and Stephen Lin. "Removal of image artifacts due to sensor dust." 2007 IEEE Conference on Computer Vision and Pattern Recognition. IEEE, 2007. (Year: 2007).*

* cited by examiner

FIG. 6A
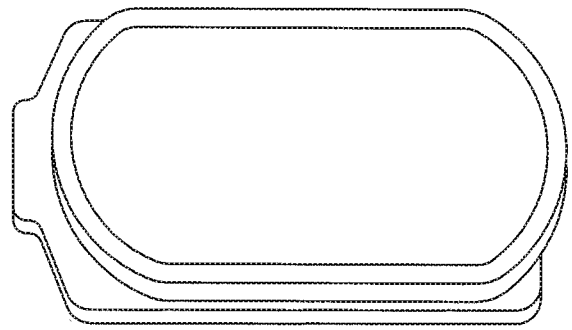
No scratches
FIG. 6B
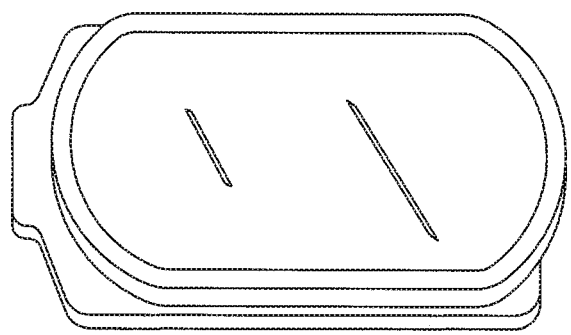
2 scratches
FIG. 6C
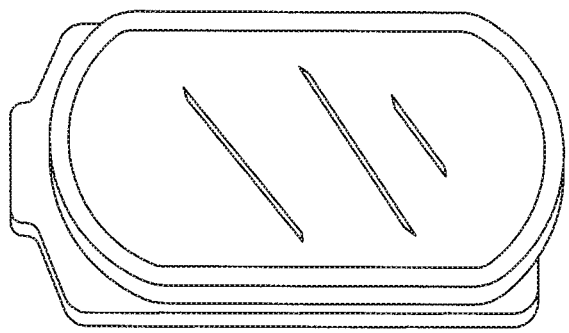
3 scratches
FIG. 6D
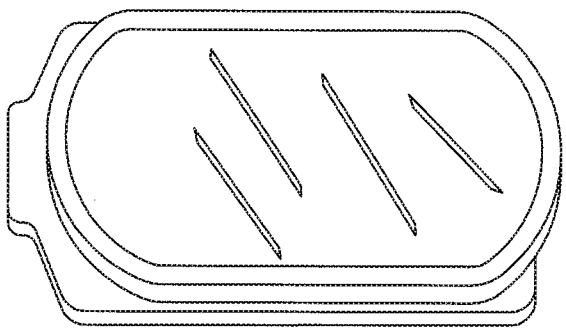
4 scratches
FIG. 6

SYSTEMS AND METHODS FOR DETECTING AND MANAGING FINGERPRINT SENSOR ARTIFACTS

FIELD

The present disclosure generally relates to systems and methods for biometric recognition, and more particularly to systems and methods for detecting biometric sensor artifacts, such as scratches on the surface of a biometric sensor, and managing the same.

BACKGROUND

Biometric matching or authentication systems are used for enrolling and authenticating users of devices incorporating the authentication systems. Biometric sensing technology provides a reliable, non-intrusive way to enroll and verify individual identity for authentication purposes.

A common biometric feature used for authentication is a fingerprint. Fingerprints, like certain other biometric characteristics, are based on unalterable personal characteristics and thus are a reliable mechanism to recognize individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, in particular portable applications, may require electronic fingerprint sensing systems that are compact, highly reliable, and inexpensive.

In biometric matching and authentication systems, a primary goal is to determine whether a verification view of the biometric feature such as a fingerprint is a match or not with an enrollment template that stores multiple enrollment views of the biometric feature. In general, there are two types of errors associated with biometric recognition: false acceptance and false rejection. False acceptance occurs when there are enough similarities between fingerprints of two different individuals, that one may be mistaken for the other. For example, false acceptance may occur when the verification view of an imposter (a user not associated with the enrollment views) is sufficiently similar to the enrollment view(s) in the enrollment template (associated with a user registered with the system). False acceptance is often quantified by a false acceptance rate ("FAR"). False rejection occurs when the user registered with the system is not identified as the registered user. For example, false rejection may occur when a (registered) user provides an input fingerprint view which is not accepted as matching enrollment views previously provided by the same user. False rejection is often quantified by a false rejection rate ("FRR").

Fingerprint sensors can develop fixed-location artifacts over time, for example, due to physical scratches or partially damaged electronics (e.g., dead pixels, dead columns, etc) which may affect the FAR and the FRR. It is therefore desirable to identify and manage fixed-position artifacts in biometric sensors.

BRIEF SUMMARY

The present disclosure provides systems and methods for identifying and managing fixed sensor artifacts, such as scratches and non-operational sensor pixels, in a biometric sensor.

According to an embodiment, a method of detecting and managing or compensating for a sensor artifact in a biometric sensor is provided. The method typically includes receiving a plurality of images from the biometric sensor, wherein each image is acquired by the biometric sensor in response to detection of an object proximal to a sensing surface of the biometric sensor, wherein the biometric sensor comprises an array of sensor locations, and wherein each image includes an array of pixel locations corresponding to the array of sensor locations. The object detected proximal to the sensing surface may be a biometric object such as a fingerprint, or it may a non-biometric object. The method also typically includes determining a pixel value for each pixel location in the array of pixel locations in each image of the plurality of images, determining one or more specific pixel locations in the array of pixel locations that have a pixel value having substantially the same bias in each of the plurality of images, and identifying an artifact pattern of the biometric sensor, wherein the artifact pattern includes sensor locations corresponding to the one or more specific pixel locations. The method further typically includes storing a representation of the artifact pattern in a memory. The method further typically includes receiving a new image from the biometric sensor, and compensating for the artifact pattern in the new image, e.g., by processing the one or more specific pixel locations of the new image corresponding to the one or more specific sensor locations of the artifact pattern differently than a remainder of the pixel locations of the new image.

In certain aspects, the pixel value for each pixel location in the array of pixel locations includes an intensity value, and the identifying an artifact pattern includes, for each pixel location in the array of pixel locations, determining an average intensity value for the pixel location using the plurality of images, and identifying the artifact pattern in the plurality of images based on the average intensity values of the pixel locations. In certain aspects, the pixel value for each pixel location in the array of pixel locations includes a matching descriptor, and the identifying an artifact pattern includes determining a number of specific pixel locations for which an identity transformation between two images in the plurality of images based on the matching descriptors is satisfied, and identifying the artifact pattern in the plurality of images based on the number of specific pixel locations and coordinates of the specific pixel locations. In certain aspects, the artifact pattern corresponds to one of a scratch on an input surface of the biometric sensor and/or one or more inoperative sensor locations. In certain aspects, the method further comprises outputting an indication that an artifact pattern is present. In certain aspects, the input object includes a biometric object such as a fingerprint.

According to another embodiment, an electronic device for biometric recognition of a biometric input object is provided that implements the methods herein. For example, in one embodiment the electronic device includes a biometric sensor configured to sense an input object proximal to an input surface of the biometric sensor, the biometric sensor comprising an array of sensor locations, a memory for storing processing instructions, and a processing system comprising one more processing elements, the processing system coupled to the memory and to the biometric sensor and configured execute the processing instructions. The processing instructions, when executed by the processing system typically cause the processing system to receive a plurality of images from the biometric sensor, wherein each image is acquired by the biometric sensor in response to sensing an input object proximal to the input surface of the biometric sensor, wherein each image includes an array of pixel locations corresponding to the array of sensor locations, determine a pixel value for each pixel location in each image, determine, for each pixel location in the array of pixel locations, one or more specific pixel locations having substantially the same biased pixel value in the plurality of images, and identify an artifact pattern of the biometric sensor based on the values of the pixel locations, wherein the artifact pattern includes sensor locations corresponding to the one or more specific pixel locations having substantially the same biased pixel value in the plurality of images. The processing instructions, when executed by the processing system further typically cause the processing system to store a representation of the artifact pattern to the memory. The processing instructions, when executed by the processing system further typically cause the processing system to receive a new image from the biometric sensor, and process the one or more specific pixel locations of the new image corresponding to the one or more specific sensor locations of the artifact pattern differently than a remainder of the pixel locations of the new image.

According to yet another embodiment, a non-transitory computer readable medium is provided that stores instructions for detecting and compensating for a sensor artifact in a biometric sensor, wherein the biometric sensor comprising an array of sensor locations. The instructions, when executed by a processing system, typically cause the processing system to receive a plurality of images from the biometric sensor, wherein each image is acquired by the biometric sensor in response to sensing an input object proximal to an input surface of the biometric sensor, wherein each image includes an array of pixel locations corresponding to the array of sensor locations, determine a pixel value for each pixel location in each image, determine, for each pixel location in the array of pixel locations, one or more specific pixel locations having substantially the same biased pixel value in the plurality of images, and identify an artifact pattern of the biometric sensor based on the values of the pixel locations, wherein the artifact pattern includes sensor locations corresponding to the one or more specific pixel locations having substantially the same biased pixel value in the plurality of images. The instructions, when executed by the processing system further typically cause the processing system to store a representation of the artifact pattern to the memory. The instructions, when executed by the processing system further typically cause the processing system to receive a new image from the biometric sensor, and process the one or more specific pixel locations of the new image corresponding to the one or more specific sensor locations of the artifact pattern differently than a remainder of the pixel locations of the new image.

According to yet a further embodiment, a method of processing an image acquired by a biometric sensor is provided. The method typically includes receiving an input image in response to detection of an input object proximal to a sensing surface of the biometric sensor, wherein each image includes an array of pixel locations corresponding to an array of sensor locations of the biometric sensor, aligning the input image with an enrollment template, and determining whether the new image results in an identity transformation, or a near-identity transformation, with the enrollment template during the aligning. In certain aspects, when the new image results in an identity transformation, or a near-identity transformation, with the enrollment template, the method further includes rejecting the new image. In certain aspects, when the new image results in an identity transformation, or a near-identity transformation, with the enrollment template, the method further includes removing one or more features consistent with the identity transformation or the near-identity transformation from the new image to produce a modified image and aligning the modified image with the enrollment template.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

FIG. 6 illustrates a sensor including an increasing number of scratches on the input surface of the sensor: FIG. 6A shows no scratches on the input surface of the sensor; FIG. 6B shows two scratches on the input surface of the sensor; FIG. 6C shows three scratches on the input surface of the sensor; and FIG. 6D shows four scratches on the input surface of the sensor.

Figure 7A:
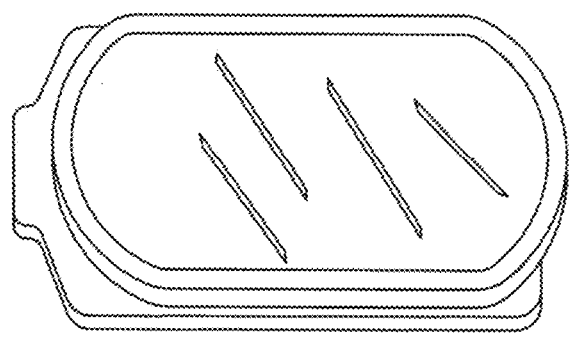
Figure 7B:
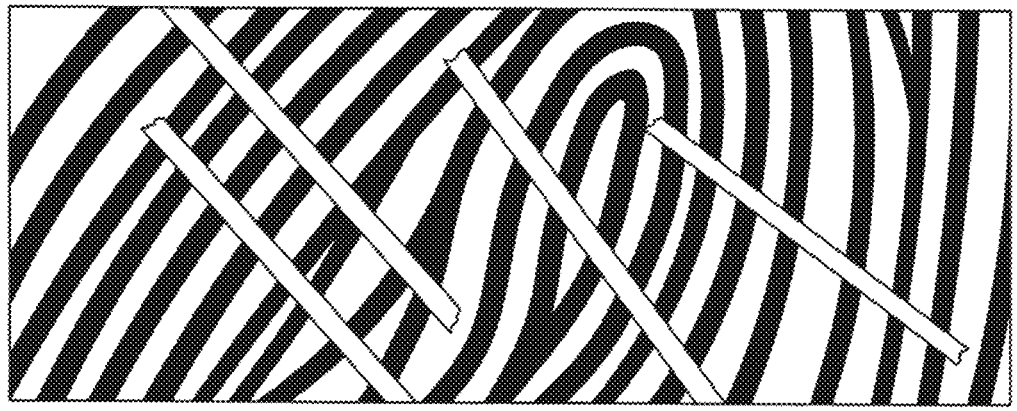
Figure 7C:
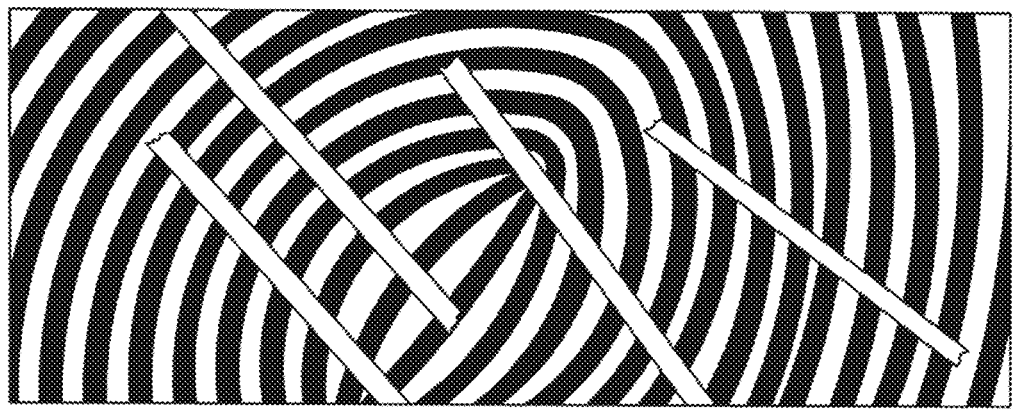

FIG. 7A illustrates an example of a sensor including four scratches on an input surface of the sensor, and FIG. 7B and FIG. 7C illustrate examples of fingerprint images obtained from the scratched sensor shown in FIG. 7A for two different users, respectively.

Figure 8A:
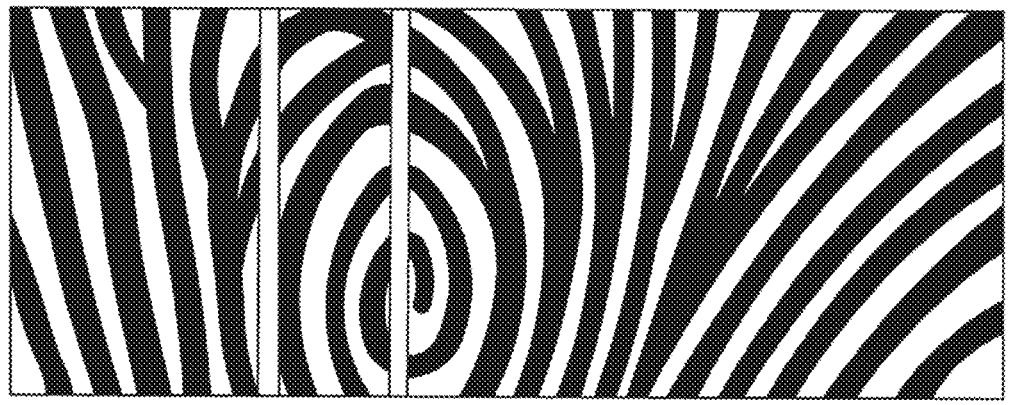
Figure 8B:
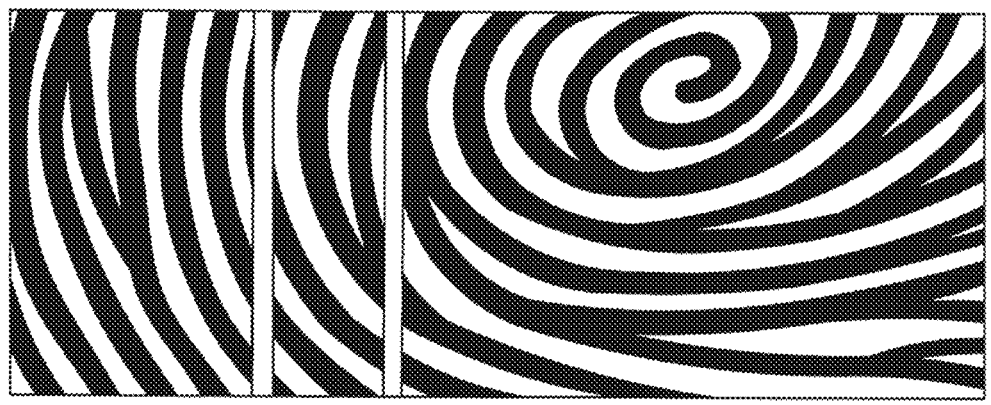

FIGS. 8A and 8B illustrate a simulated example of a sensor artifact (bad or non-operational sensor columns) on two different views of a fingerprint of a single user.

Figure 9:
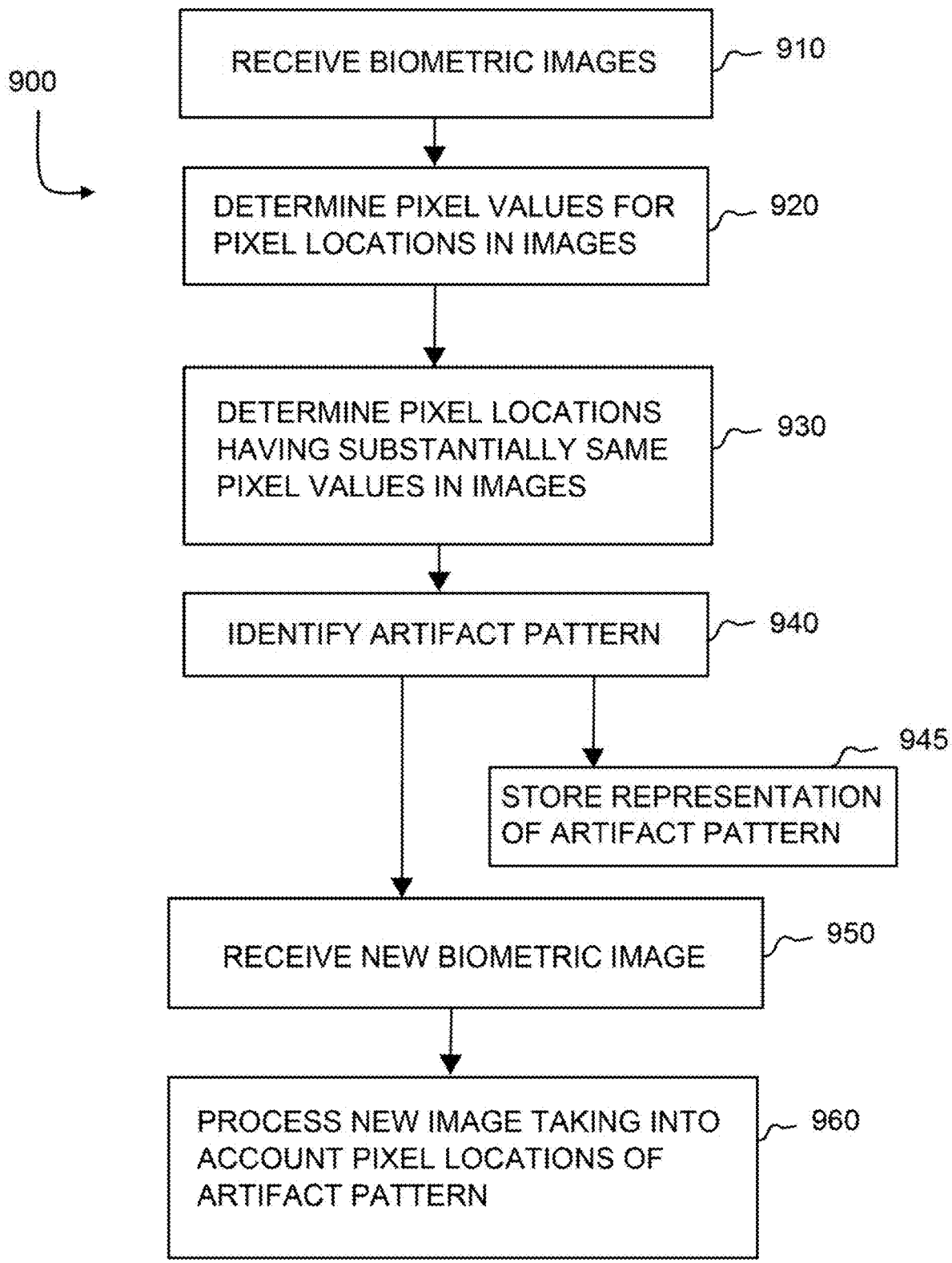

FIG. 9 illustrates a method of detecting and managing a sensor artifact in a biometric sensor according to an embodiment.

Figure 10A:
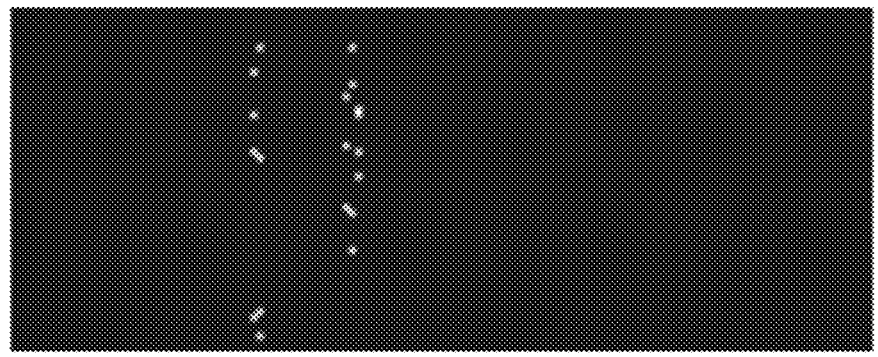

FIG. 10A shows an example mask produced by matching 2 images in FIG. 8A and FIG. 8B (simulated defects) that agree on the identity transformation.

Figure 10B:
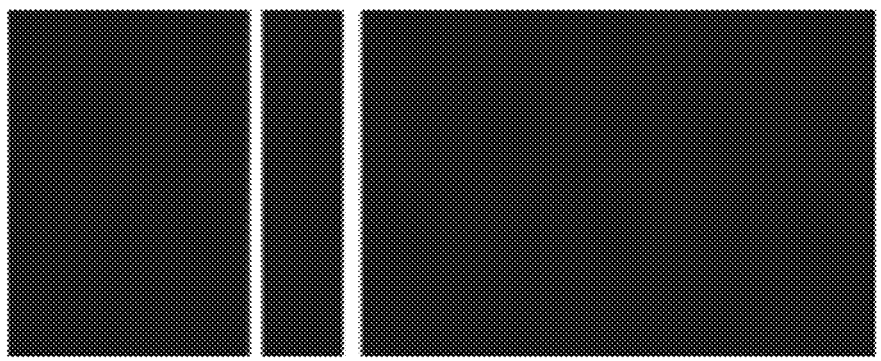

FIG. 10B shows an example mask produced by thresholding an average of n images (including the simulated defects shown in FIGS. 8A and 8B).

Figure 11A:
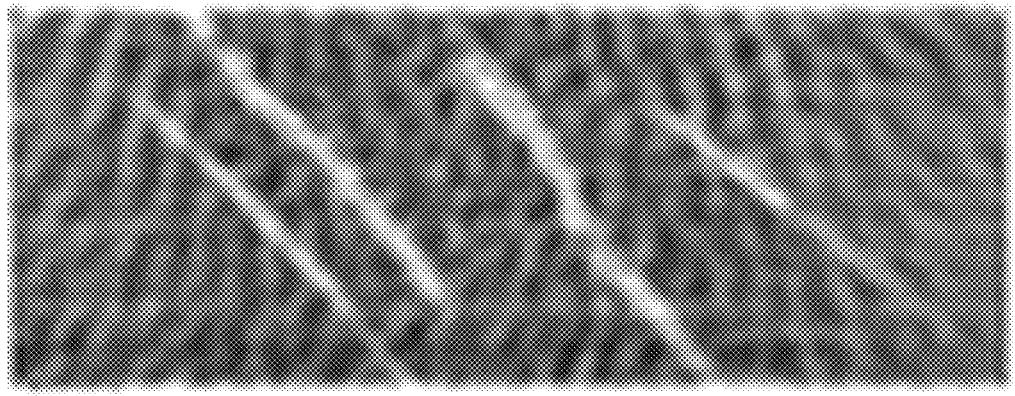

FIG. 11A shows an example average image produced by taking a rolling average of 10 images taken using the scratched sensor of FIG. 7A.

Figure 11B:
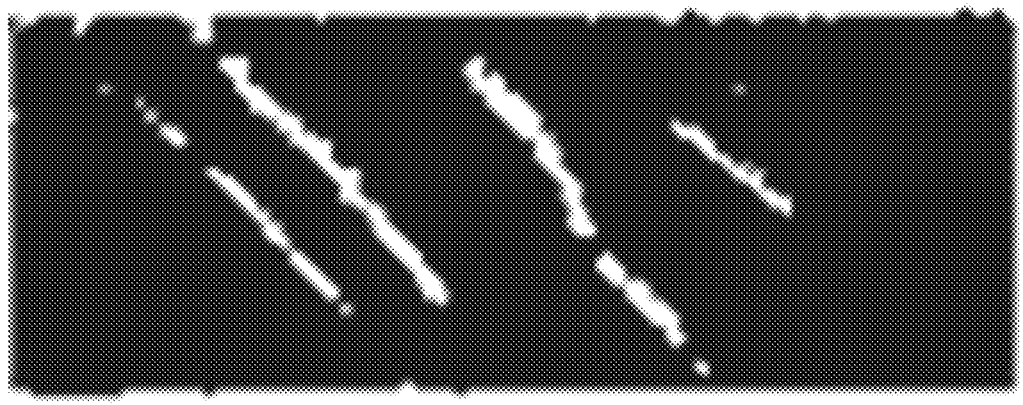

FIG. 11B shows an example mask produced by thresholding a rolling average of 10 images taken using the scratched sensor of FIG. 7A.

Figure 12A:
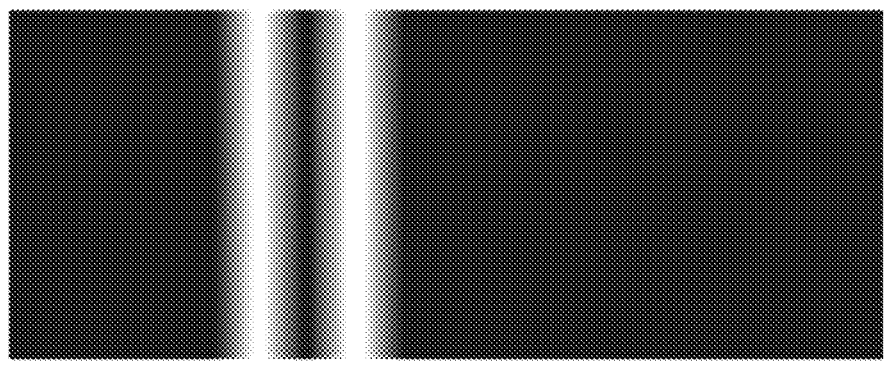

FIG. 12A shows a probability map for a descriptor of radius r based on the mask shown in FIG. 10B, according to an embodiment.

Figure 12B:
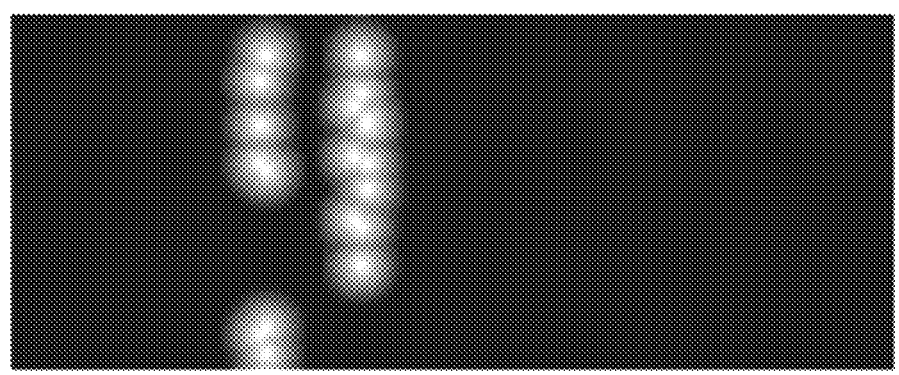

FIG. 12B shows a probability map for a descriptor of radius r based on the mask shown in FIG. 10A, according to an embodiment.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present disclosure provide input devices and methods that facilitate improved usability.

Figure 1:
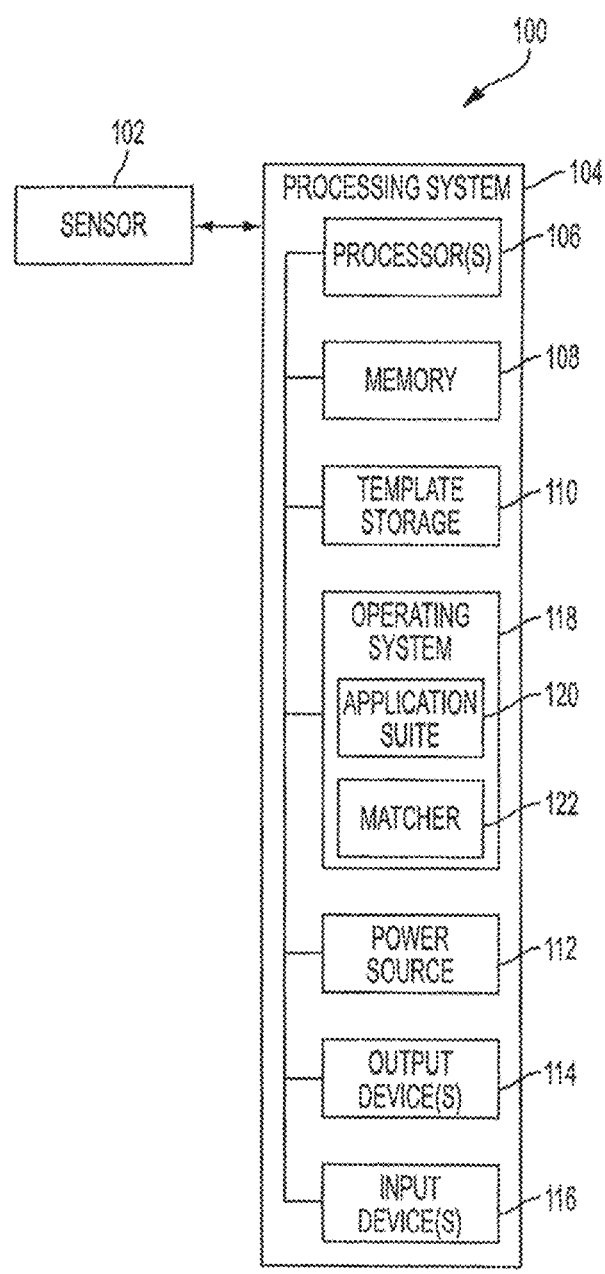
FIG. 1 is a block diagram of an electronic system or device that includes an input device such as sensor and processing system, in accordance with an embodiment of the disclosure.

Turning now to the figures, FIG. 1 is a block diagram of an electronic system or device 100 that includes an input device such as sensor 102 and processing system 104, in accordance with an embodiment of the disclosure. As used in this document, the term "input device" and "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the processing system 104 could be a host or a slave to the sensor 102.

Sensor 102 can be implemented as a physical part of the electronic device 100, or can be physically separate from the electronic device 100. For example, sensor elements of sensor 102 may be integrated in a display device that is itself implemented as a physical part of the electronic device 100 or communicably coupled with the electronic device 100. As appropriate, the sensor 102 may communicate with parts of the electronic device 100 using any one or more of the following communication interconnections: buses, networks, and other wired or wireless interconnections. Examples include $I^2C$, SPI, PS/2, Universal Serial Bus (USB), Bluetooth, RF, and IRDA.

Generally, sensor 102 will be utilized as a biometric sensor utilizing one or more various electronic biometric feature sensing methods, techniques and devices to capture a biometric image of a user. One example of a biometric feature is a fingerprint; the biometric sensor 102 will be referred to herein as a fingerprint sensor 102, however, one skilled in the art will understand its applicability to other biometric features. Generally, fingerprint sensor 102 may utilize any type of technology to capture a user's fingerprint. For example, in certain embodiments, the fingerprint sensor 102 may be an optical, capacitive, thermal, pressure, radio frequency (RF) or ultrasonic sensor.

In some embodiments, the sensor 102 is a capacitive fingerprint sensor, with the traces that form a 2D grid array, e.g., with rows of transmitter/receiver traces on one substrate and columns of receiver/transmitter traces on the same or a separate substrate, e.g., laminated together with some form of dielectric between the traces to form a 2D sensor element array.

Furthermore, biometric image sensors, such as fingerprint sensors, are sometimes referred to as "swipe" sensors or "placement" sensors depending on their principle of operation. Typically, swipe sensors capture an image that is larger than the sensing area by capturing a series of scans of the fingerprint as the user swipes their finger over the sensing area. In some applications, a processing system may reconstruct the scans into a larger swipe image. Since the image may be reconstructed from a series of scans, this allows the sensing array to be made small, even as small as a single scan line, while still capturing a larger area image. In some applications, a larger image area can be stored as a series of scans using a map or mapping function that correlates the various scan images. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Placement sensors have an active sensing surface or in other terms, sensing area, that is large enough to accommodate a portion of the relevant part of the fingerprint of the finger during a single scan or sensing action. Where the relevant part of the fingerprint is less than the full fingerprint, this is referred to herein as a "partial" fingerprint sensor. Partial fingerprint placement sensors can be made very small and still reliably recognize fingerprints with sophisticated matching schemes. Typically, for placement sensors, the finger is held stationary over the sensing area during a measurement. During a fingerprint enrollment process, multiple views of the fingerprint image may be captured.

Generally, swipe sensors can be made smaller in size than placement sensors that capture an equivalent fingerprint area, and require the finger to be moved over the sensor during a measurement. Typically, the finger movement will be either 1D in that the finger moves in a single direction over the sensor surface, or the finger movement can be 2D in that the finger can move in more than one direction over the sensor surface during a measurement. In certain embodiments of this disclosure, a placement sensor may be operated in a swipe mode. In these embodiments, a placement sensor may capture a swipe image by capturing a series of scans during relative motion between the sensor array and the user's fingerprint, and the series of scans are reconstructed into a larger area swipe image. In one implementation, the placement sensor captures the scans using its entire sensor array. In another implementation, the placement sensor looks to only a subset of pixels in its sensor array, such as one or two scan lines, when capturing the swipe image.

Turning now to the processing system 104 from FIG. 1, basic functional components of the electronic device 100 utilized during capturing and storing a user fingerprint image are illustrated. The processing system 104 includes a processor 106 (or multiple processors), a memory 108, a template storage 110, a power source 112, an output device(s) 114, an input device(s) 116 and an operating system (OS) 118 hosting an application suite 120 and a matcher 122. Each of the processor 106, the memory 108, the template storage 110, the power source 112, the output device(s) 114, the input device(s) 116 and the operating system 118 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment data including registration or enrollment views for fingerprint images for a user's fingerprint as well as transformation data and localization data linking or relating the various stored views. A transformation may be referred to herein as a "transform" or an "edge," where edge refers to connectivity information linking two nodes (e.g., views) in a transformation graph such as a template graph. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 includes one or more power sources 112 to provide power to the electronic device 100, and in some embodiments to sensor 102. Non-limiting examples of power source 112 include single-use power sources, rechargeable power sources, and/or power sources developed from nickel-cadmium, lithium-ion, or other suitable material.

The processing system 104 includes one or more input devices 116. Input devices 116 are configured to receive input from a user or a surrounding environment of the user through tactile, audio, and/or video feedback. Non-limiting examples of input device 116 include a presence-sensitive screen, a mouse, a keyboard, a voice responsive system, video camera, microphone or any other type of input device. In some examples, a presence-sensitive screen includes a touch-sensitive screen. In certain embodiments, the sensor 102 may be included as an input device 116.

One or more output devices 114 are also included in processing system 104. Output devices 114 are configured to provide output to a user using tactile, audio, and/or video stimuli. Output device 114 may include a display screen (e.g., part of the presence-sensitive screen), a sound card, a video graphics adapter card, or any other type of device for converting a signal into an appropriate form understandable to humans or machines. Additional examples of output device 114 include a speaker such as headphones, a cathode ray tube (CRT) monitor, a liquid crystal display (LCD), or any other type of device that can generate intelligible output to a user.

The processing system 104 also hosts an operating system 118. The operating system 118 controls operations of the components of the processing system 104. For example, the operating system 118 facilitates the interaction of the processor(s) 106, memory 108, template storage 110, power source 112, output devices 114 and input devices 116. The operating system 118 further hosts the application suite 120. The application suite 120 contains applications utilizing data stored on the memory 108 and/or the template storage 110 or data collected from input devices 112 or the sensor 102 to cause the processing system 104 to perform certain functions, e.g., the various sensor artifact detecting functions including the artifact managing functions as described herein.

In certain embodiments, the application suite 120 hosts an enroller application, which functions to capture one or more biometric images or views, e.g., images or views of the user's fingerprint. The views or fingerprint images generally contain a partial or full image of the biometric feature(s), e.g., user's fingerprint. For example, the enrollment application may instruct, either explicitly or implicitly, the user to hold or swipe their finger across the sensor 102 for capturing or acquiring the image of the fingerprint. After each requested biometric view is captured, the enrollment application typically stores the captured view in the template storage 110, e.g., as an enrollment view. In certain embodiments, the enrollment application will cause the data representing the captured view to undergo further processing. For instance, the further processing may be to compress the data representing the captured view such that it does not take as much memory within the template storage 110 to store the image.

The enrollment process can be tedious and may require many "good" touches by the user, which can be time consuming and onerous to the user. Also, the template memory is usually limited and only a certain number of views or images may be stored in the template storage 110. Typically, information pertinent to the views stored in the template is also stored in the template storage. Such pertinent information typically includes keypoint locations and descriptors for the stored views and transformations between the views. Information regarding transformations may include information such as a horizontal transformation, a vertical transformation, and a rotation relative to another view. Additionally, there is no guarantee that the enrollment process will provide sufficient fingerprint coverage. In one embodiment, fewer views are captured during enrollment and additional views are obtained and the template updated during normal operation, e.g., during an authentication process occurring after enrollment has concluded. This advantageously reduces time spent by the user enrolling a biometric feature.

In certain embodiments, the application suite 120 will also contain applications for authenticating a user of the electronic device 100. For example, these applications may be an OS logon authentication application, a screen saver authentication application, a folder/file lock authentication application, an application lock and a password vault application. In each of these applications, the individual application will cause the operating system 118 to request the user's biometric feature, e.g., fingerprint, for an authentication process prior to undertaking a specific action, such as providing access to the OS 118 during a logon process for the electronic device 100. To perform this process, the above listed applications will utilize the matcher 122 hosted by the operating system 118. The matcher compares authentication view(s) with the views in the enrollment template to determine whether the input view matches the enrollment template. For example, the matcher identifies features of the biometric input view and compares those features with the enrollment template to produce a correlation score; the correlation score may be compared with a threshold value to determine whether user identification or authentication is successful or fails. Various features compared may include fingerprint ridges and fingerprint minutia.

Figure 2B:
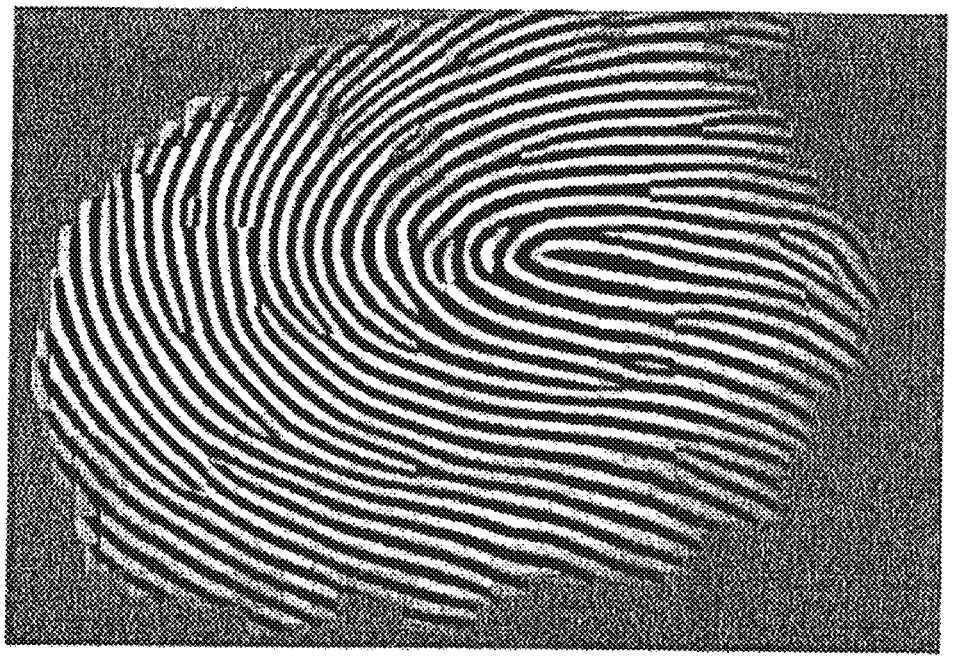
FIGS. 2A and 2B illustrate grayscale fingerprint images that show various ridges and minutiae of a fingerprint, according to an embodiment.
Figure 2A:

FIG. 2A illustrates a grayscale fingerprint image that shows various ridges and minutiae of a fingerprint, according to one embodiment. As can be seen in FIG. 2A, the image is noisy such that portions of the image are cloudy and the ridges or contours are broken. FIG. 2B is an enhanced image of the fingerprint of FIG. 2A.

Figure 3:
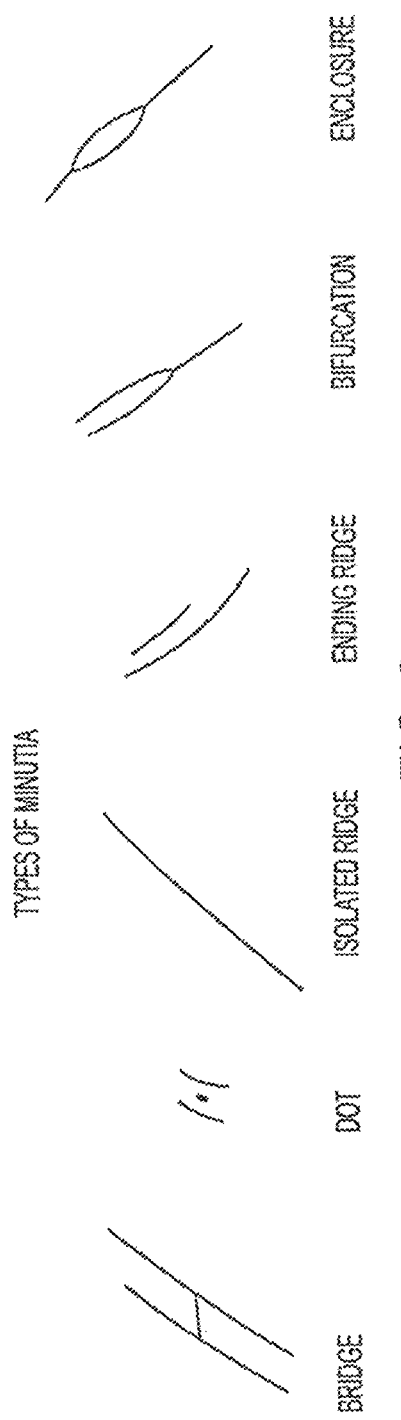
FIG. 3 illustrates various types of fingerprint minutia, according to some embodiments.

FIG. 3 illustrates various types of fingerprint minutia, according to some embodiments. Examples of fingerprint minutia include: a bridge point between two or more ridges, a dot, an isolated ridge, an ending ridge, a bifurcation point, and an enclosure. Other minutia point types not shown in FIG. 3 are also within the scope of the disclosure. Each minutia point in a fingerprint image is associated with a location (in two dimensions) and an orientation. In some embodiments, the orientation of a minutia point corresponds to the tangent of the ridge going through the minutia point.

Figure 4B:
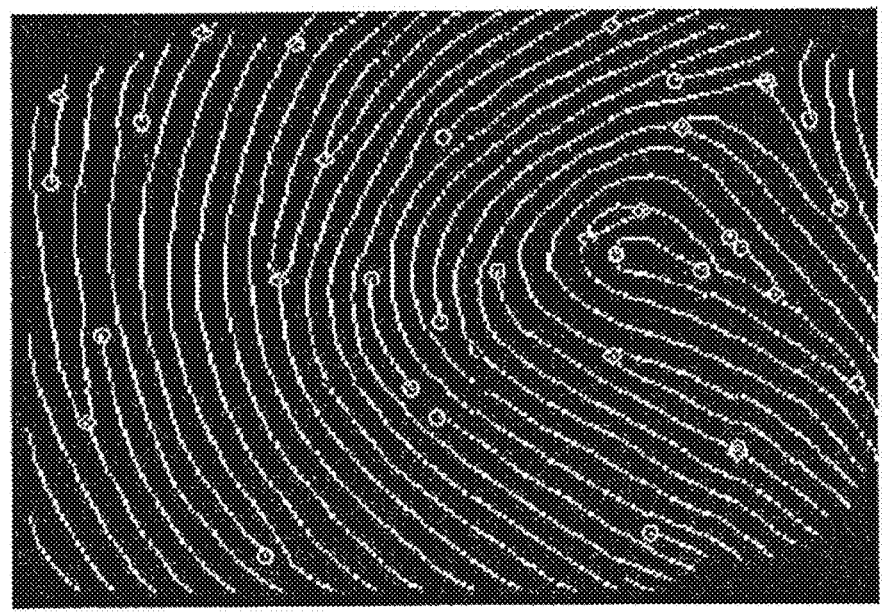
FIG. 4B illustrates a thin-ridge version of the grayscale fingerprint image in FIG. 4A, according to one embodiment.
Figure 4A:
FIG. 4A illustrates a grayscale fingerprint image that shows various ridges and minutiae of a fingerprint, according to one embodiment.

FIG. 4A illustrates a grayscale fingerprint image that shows various ridges and minutiae of a fingerprint, according to one embodiment. FIG. 4B illustrates a thin-ridge version of the grayscale fingerprint image in FIG. 4A, according to one embodiment. Fingerprint skeletonization, also sometimes referred to as an "edge map," "edge image," or "thinned ridge image," depending on the context, is the process of converting the ridge lines in a grayscale fingerprint image (see, for example, the image in FIG. 4A) to a binary representation, and reducing the width of binarized ridge lines to one pixel wide. As can be seen in FIG. 4B, the skeletonized version of the grayscale fingerprint image removes much of the noise so that the image is no longer cloudy and the ridge lines are no longer broken.

Additionally, in embodiments where the sensor 102 (see FIG. 1) is a partial fingerprint sensor such as a partial placement sensor, due to the size of the sensing area of the sensor 102 typically being smaller than the user's fingerprint area, a multitude of input biometric views, or placement images or views, of the user's fingerprint from the placement sensor 102 may be collected to form the enrollment template such that it adequately describes the user's fingerprint. As the multitude of placement images are collected, the enroller function of the application suite 120 calls on the matcher 122 to relate the placement views with each other such that they can be grouped into an accurate composite of the user's fingerprint.

Figure 5:
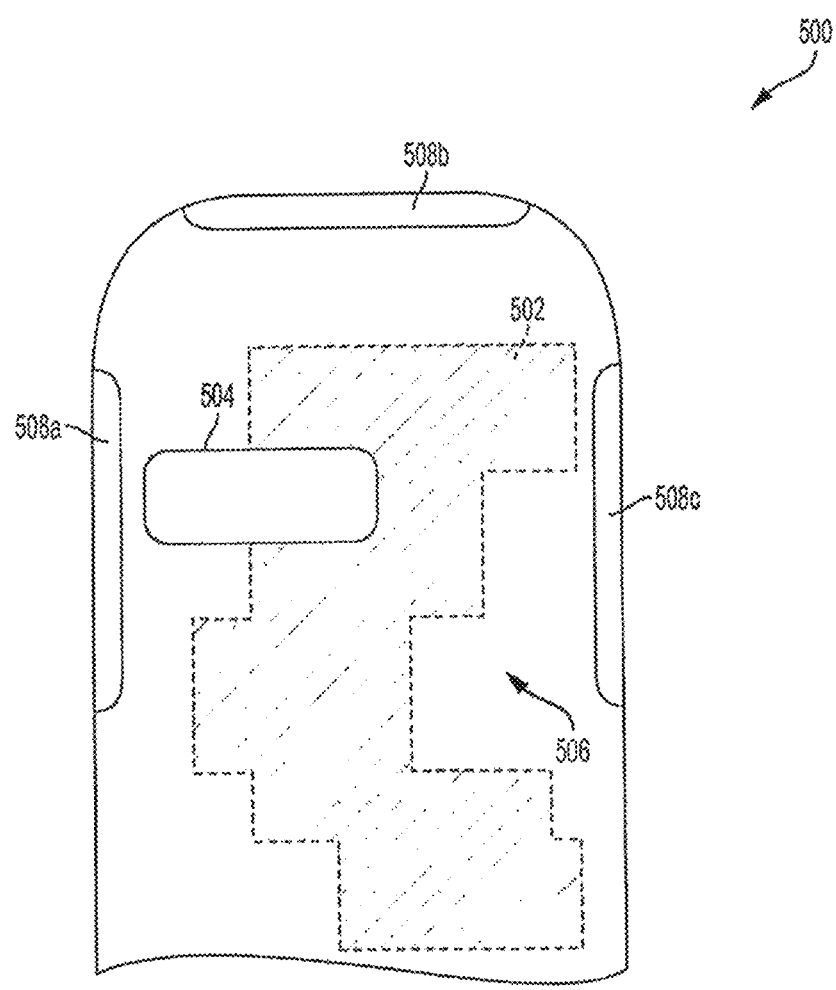
FIG. 5 is an illustration of an exemplary embodiment of a user's fingerprint showing a collection of localized placement views that form a portion of the user's fingerprint.

FIG. 5 is an illustration of an exemplary embodiment of a user's fingerprint 500 showing a collection of localized placement views that form a portion 502 of the user's fingerprint 500. A recently collected placement view 504 is illustrated in relation to the portion 502. The placement view 504 will be localized in comparison to the portion 502 in order to determine how it fits along with the rest of portion 502. In the illustrated embodiment, placement view 504 overlaps with the portion 502 of the user's fingerprint already localized and collected into the enrollment template. However, in other embodiments, the placement view 504 may not overlap with the portion 502, or only have a small overlap resulting in a low confidence in the alignment, such that localizing the placement view 504 by comparing to previous localized portions of the fingerprint becomes more difficult. In addition, multiple disconnected views or clusters of views may result, and for which reliable alignment becomes difficult without a global reference for localization. As further illustrated, a portion 506 of the user's fingerprint 500 has not been presented to the placement sensor 102 and therefore has not been collected for adding to the enrollment template. However, as the enroller of the application suite 120 and the matcher 122 do not have prior knowledge of the user's fingerprint 500, the portion 506 of the user's fingerprint that has not been collected is an unknown. Therefore, in situations where there is no overlap between the placement view 504 and the collected portion 502, it becomes difficult to locate where the placement view 504 should be located in the uncollected portion 506 in relation to the collected portion 502.

Sensor Artifact Detection Processing

In some instances, fixed sensor artifacts, such as scratches on an input surface of the biometric sensor or non-operation pixel locations of the biometric sensor may impact operation of the biometric sensor.

According to certain embodiments, methods for identifying and managing sensor artifacts are provided. A sensor artifact may include a mechanical defect such as a scratch or other permanent or semi-permanent marking on an input surface of a sensor or other material layer in the sensing region of the sensor. A sensor artifact may include a physical or electrical defect in the sensor itself, such as non-operational or dead sensor location (pixel), including for example, malfunctioning relay lines associated with one or more sensor locations.

Fixed artifacts, such as scratches, could impact the FAR and the FRR of a biometric sensor and could result in either a false acceptance or a false rejection of the proper user during verification. FIG. 6 illustrates a sensor including an increasing number of scratches on the input surface of the sensor: FIG. 6A shows no scratches on the input surface of the sensor; FIG. 6B shows two scratches on the input surface of the sensor; FIG. 6C shows three scratches on the input surface of the sensor; and FIG. 6D shows four scratches on the input surface of the sensor. Such artifacts as shown in FIGS. 6A-6D may have an impact on the operation of the sensor in terms of the impact on FAR and FRR. Studies were performed on a sensor similar to that shown in FIGS. 6A-6D, with an increasing number of scratches, based on data for two different users with 18 enrollment views for each and 100 verification attempts (images) taken for each user. It was found that, the FRR increases as the number of scratches (amount of sensor locations impacted by artifacts) increases. The FAR also was found to increase as the number of scratches increased; a false alignment, or false acceptance, was found to occur in the data for the sensor with 4 scratches present Fewer or greater number of scratches or defects may impact the sensor differently, depending on the severity of the scratch(es) or other defects.

FIG. 7A illustrates an example of a sensor including four scratches on an input surface of the sensor, and FIG. 7B and FIG. 7C illustrate examples of fingerprint images obtained from the scratched sensor shown in FIG. 7A for two different users, respectively. As can be seen, sensor scratches appear in each of the fingerprint images shown in FIG. 7B and FIG. 7C. Although the scratches, or other sensor artifacts, may not appear in a blank image taken without the presence of the user's fingerprint; the presence of a biometric object, such as the user's fingerprint, proximal to the input surface of the sensor may make certain artifacts visible in the resulting image or view.

FIGS. 8A and 8B illustrate a simulated example of a sensor artifact (bad or non-operational sensor columns) on two different views of a fingerprint of a single user. The ridges in the fingerprint views should align with a 90 degree transformation. However, the defects in the images caused by the sensor artifact might produce faulty detection of artifact points at the same image locations by a matching algorithm, resulting in a zero degree identity transformation.

FIG. 9 illustrates a method 900 of detecting and managing a sensor artifact in a biometric sensor. The biometric sensor may be any type of biometric sensor, such as a fingerprint sensor. The biometric sensor includes an array of sensor locations that image a portion of the biometric object proximal to the sensing surface of the biometric sensor and which produce an image of the biometric object having an array of pixel locations corresponding to the array of sensor locations. The sensor locations are defined by the type of sensor used. For example, for a capacitive sensor, the sensor locations are defined by the underlying electrode elements pattern, and for an optical sensor, the sensor locations are defined by the optical detection elements of the sensor. The resolution of the image is determined by the resolution of the underlying sensor elements.

In step 910, a plurality of images are acquired by the biometric sensor 102 and received by the processing system 104 from the biometric sensor. In certain embodiments, each image is acquired by the biometric sensor in response to detection of an input object proximal to a sensing surface of the biometric sensor. The input object detected proximal to the sensing surface typically will be a biometric object such as a fingerprint, but it may be a non-biometric object such as may trigger the acquisition of an image. An example of the latter may be the proximity of any surface to the biometric sensor, e.g., when a device is placed in a bag or in a users pocket. In step 920, a pixel value is determined for each pixel location in each image. In some embodiments, a pixel value may include an intensity value. In other embodiments, the pixel value may include information such as a descriptor. Examples of descriptors might include descriptors based on algorithms such as scale invariant feature transform (SIFT), speeded up robust features (SURF), local binary patterns (LBP), and the like. In this manner, each image may be represented by an array of pixel values corresponding to the array of pixel locations. In step 930, for each pixel location in the array of pixel locations, one or more specific pixel locations having substantially the same pixel value in the plurality of images is determined. As examples, this determination may include determining an average pixel value for each pixel location, or comparing pixel values between images for each pixel location as will be discussed in more detail below.

In step 940, an artifact pattern of the biometric sensor is determined based on the values of the individual pixel locations. For example, the artifact pattern may be identified as the sensor locations corresponding to the one or more specific pixel locations having substantially the same or a similar pixel value in the plurality of images. In step 945, a representation of the artifact pattern may be stored to memory such as to template storage 110, memory 108 or other memory. For example, the specific sensor locations may be stored and/or a probabilistic representation of the artifact pattern is updated. In some embodiments, as will be described in more detail herein, a binary mask or a probability mask may be created based on the identified artifact locations and the mask may be stored as the representation.

In order to manage the artifact pattern, and reduce the impact the artifact pattern may have on later acquired images, information regarding the identified artifact pattern may be used to process later-acquired images. For example, in step 950, a new image from the biometric sensor may be received, and in step 960, the new image is processed taking into account the pixel locations corresponding to the sensor locations of the determined artifact pattern. For example, during an authentication or verification process, the one or more specific pixel locations of the new image corresponding to the one or more specific sensor locations of the artifact pattern may be processed taking into account the information regarding the sensor locations (and the corresponding image pixel locations). In an embodiment, the specific pixel locations in the new image may be processed in a different manner than a remainder of the pixel locations of the new image. For example, processing pixels in a different manner may include ignoring all or a subset of pixels in the new image corresponding to pixel locations of the artifact pattern, or it may include diminishing or altering values of all or a subset of pixels in the new image corresponding to pixel locations of the artifact pattern. In certain embodiments, processing pixels in a different manner includes applying a binary mask or a probability mask as described herein.

In certain embodiments, a set of one or more statistics for the intensity values of the pixel locations may be determined, and if these statistics are significantly different for a set of pixel locations, the set can be considered as containing pixel locations that have substantially the same or similar pixel values (i.e., pixels having substantially the same bias) and can be considered as belonging to the artifact area or region. One such statistic is an "average".

As discussed above, determining pixel locations having substantially the same biased value in the biometric images in step 930 may be performed in different ways. According to one embodiment, to determine pixel locations having substantially the same biased value in the images, average values for each pixel location are determined. For example, for each pixel location in the image frame an average pixel value based on the pixel values for that specific pixel location in the plurality of images may be determined. In cases where the pixel values include intensity values, an average intensity value for each pixel location may be determined. In this manner, the average image includes the average intensity value for each pixel location. Each average pixel value may be stored, indexed based on the specific pixel location in the image frame may be stored, or an average image, representing the average pixel intensity values, may be generated and stored. In general, the more images acquired and processed, the better the averaging results may be. In certain embodiments at least 10 images may need to be acquired and averaged to produce reasonable results, however acquiring and averaging fewer images may provide reasonable results.

In certain embodiments, either a running average or a traditional average can be implemented. For a running average, for each new image acquired, the new image can be processed to determine or re-determine pixel values for the array of pixel locations and the averaging algorithm can be run again to include the pixel values in the new image. In either case, the averaging methodology would reveal pixel values which are roughly the same or a similar value at the same locations—pixel locations associated with an artifact should have a similar bias, such as a very high value or a very low value upon averaging, e.g., consistently lighter, or consistently darker. For pixel locations not associated with an artifact, the average pixel values are likely to average to close to a 50% value over time. For example, in an embodiment, the artifact pattern is identified as one or more first pixel locations having an average intensity value that exceeds a first threshold value (e.g., representing a consistent presence of something appearing in the images that results in a high intensity value), and one or more second pixel locations having an average intensity value that is less than a second threshold value (e.g., representing a consistent presence of nothing appearing in the images—such as a dead pixel or scratch feature that results in a low intensity value). The first threshold value may be greater than about 90% of a maximum intensity value, and the second threshold value may be less than about 10% of the maximum intensity value. These first and second threshold percentages provide a reasonable identification of pixel locations having substantially the same biased values throughout the images processes, and hence a reasonable identification of a fixed artifact, however, these threshold percentages may be adjusted to be larger or smaller as would be desirable based on the sensing methodology involved and various system parameters. In this manner, a pixel location having values with substantially the same bias in the plurality of images will generally be consistently darker or consistently lighter than other pixel locations—with a sufficient number of images (e.g., 10 or more) acquired and processed, these pixel locations having values with substantially the same bias in the plurality of images represent pixel locations attributable to an artifact such as a scratch.

This average can be calculated during enrollment only, or during verification only, or in both phases of operation. If done during enrollment only, then the average need not be stored. In other embodiments, a binary mask is generated based on the average values and the binary mask is stored, e.g., to the template storage or elsewhere. Also, enrollment could output a sensor quality measure based on the number of masked pixels. If done during the verification phase, it can help prevent introducing into the template newly appeared sensor scratches (if template-update is enabled).

According to another embodiment, to determine pixel locations having substantially the same biased value in the biometric images, a matching approach may be used to determine sensor artifacts. The matching approach may be particularly advantageous for sensor systems having limited memory which could prevent the system from being able to store the entire (average) image, and associated data. The matching approach can be coupled with matchers (e.g., matcher 122) that are already based on point-matching, or it can be added as an additional pre-processing to matchers that are based on some other principle, such as ridge-matching, minutia-matching, etc. The matching process includes detecting points on local maxima, salient, or repeatable locations between two images and optionally associating local descriptors to these points, and then determining how many pairs of points from the two images agree on the identity transformation, using for example, x,y coordinates and descriptors, if present. The points (e.g., pixel locations) that agree on an identity transformation identify points having substantially the same biased value and are very likely to be due to a fixed sensor artifact, rather than identical finger touches. In one embodiment, to verify, the number and locations of identity-transformation points are determined and analyzed to determine whether the points are spread across the image, or are clustered in small regions of the image. For example, if the identity transformation locations were due to identical finger touches, they would be spread and much more numerous.

For example, in an embodiment, where the pixel value for each pixel location includes a descriptor, an artifact pattern is identified by determining a number of specific pixel locations for which an identity transformation between two images in the plurality of images based on matching descriptors is satisfied. The artifact pattern in the plurality of images may be identified based on the number of specific pixel locations and locations of the specific pixel locations satisfying the identity transformation. In an embodiment, the identity-transformation points are stored with the images, e.g., from one image to the next, as they take up a very small amount of space (compared to storing a complete image). Further, the artifact pattern may be identified as the specific pixel locations when the number of specific pixel locations is less than a first threshold value, and/or when the specific pixel locations are arranged in one or more clusters.

FIG. 10A shows an example mask produced by matching 2 images in FIG. 8A and FIG. 8B (simulated defects) that agree on the identity transformation. FIG. 10B shows an example mask produced by averaging n images (including the simulated defects shown in FIGS. 8A and 8B).

FIG. 11A shows an example average image produced by taking a rolling average of 10 images taken using the scratched sensor of FIG. 7A. Examples of images included in the averaging process are shown in FIG. 7A and FIG. 7B. FIG. 11B shows an example mask produced by a rolling average of 10 images taken using the scratched sensor of FIG. 7A.

The above averaging and matching embodiments work particularly well for close-in-time images, however, they may not work as well if one or more of the images used was taken before the scratch or artifact appeared on the sensor. Scratches generally do not disappear, so there is always going to be a good number of consecutive images exhibiting an effect from a scratch.

In another embodiment, a measure of the amount of sensor area impacted by a sensor artifact, e.g., amount of scratched area in the sensor, may be output. For example, such information may be provided visually to a user of an electronic device embodying the biometric sensor and processing system, or such information may be provided to another device or system so that appropriate action may be taken by the user of the device or another entity. Such information may be useful for the user of the device, or the manufacturer of the device or a component thereof or other entity, to decide if the sensor is reliable or not.

In one embodiment, the artifact detection mechanisms may be utilized to make the matcher 122 more robust to the scratches or artifacts. Most matcher approaches use algorithms that analyze or filter an image locally with some kernel width or widths. Hence, in one embodiment, if the maximum width of a kernel is w, then the sensor artifact coordinates and all coordinates within a distance w from the artifact should be ignored. In one embodiment, a binary mask identifying the pixel locations identified as artifact locations is created. Alternatively, a distance transform such as a probability mask is created, which quantifies the reliability of each image coordinate (pixel location), based on how far a coordinate is from a detected sensor artifact coordinate. This type of mask may take up more storage space, but advantageously quantifies reliabilities rather than completely disabling a number of coordinates. Examples of distance transform masks are shown in FIGS. 12A and 12B: FIG. 12A shows a probability map for a descriptor of radius r based on the mask shown in FIG. 10B and FIG. 12B shows a probability map for a descriptor of radius r based on the mask shown in FIG. 10A. For both probability maps shown, the lighter area indicates unreliable data at that location and darker indicates that the data at that location does not include an artifact location within a radius of r, where r is 7 pixel locations in the current example. It should be appreciated that the value r can be any value as would provide useful results.

Independently of the matching algorithm (ridge-based, feature-based, etc), the probability mask or the binary mask can be exploited to weigh or ignore features (ridges, minutiae, points, descriptors) located in the masked areas. For example, a binary mask may be used such that when applied to an image, pixel locations identified by the mask are ignored during processing of the image. As another example, for a distance transform mask, when applied to an image, pixel locations identified by the distance transform mask will have probabilities or weights associated therewith, and the processing algorithm may decide how to use each masked pixel based on the probability value associated therewith. For example, on processing algorithm may decide to ignore any pixel having a value exceeding 50% (e.g., 50% or more likely to be associated with an artifact), or the algorithm may decide to reduce a value of the pixel location according to the associated probability value for that pixel.

According to another embodiment, rather than completely ignoring or discarding or diminishing any of the one or more specific pixel locations identified as artifact locations (e.g., masked locations), a new value for at least a subset of the pixel locations corresponding to artifact locations or in close proximity to artifact locations may be interpolated based on pixel values of pixel locations adjacent to these pixel locations. For example, any in-painting technique that uses the values around a masked region of one or more pixel locations may be used to interpolate the missing pixel value(s) within the masked region. The interpolation algorithm should enforce the smoothness of the structural properties of the imaged biometric object (e.g., continuity of ridges and valleys in the case of a fingerprint image) and/or smoothness of the textural properties (e.g., gradient orientations, gradient magnitudes, intensity values, etc.). In-painting embodiments are particularly advantageous for matching algorithms that exploit information regarding the surroundings of a feature in order to describe the feature. By defining or interpolating pixel values within the artifact region, the impact on the descriptors of features around the artifact region whose descriptors overlap with the artifact region is minimized. The detections of local features on the masked and interpolated area of the image may be ignored as this information may not be sufficiently reliable. Although some of the interpolated pixel values may not correspond to the real values as would otherwise be sensed, the general appearance of the image is restored, which improves the statistics that the matching algorithm may collect from the image. In-painting in this manner has been found to reduce the FRR (e.g., by about 40%) and reduce the occurrence of FA cases.

In addition the above embodiments for detecting artifacts and exploiting that information, in another embodiment a method for avoiding a scratch-induced false acceptance without necessarily detecting the scratches is provided, with a minimal increase in FRR cost. Certain embodiments include identifying the match which yields an identity transformation or a near-identity transformation (i.e., within a tolerance range of an identity transformation), and treating it in a special way. The special treatment may include discarding the features (e.g., ridges, minutiae, points, or other features) or portions of the images that produced an identity transformation or near-identity transformation, and re-calculating a transformation again, with the remaining features intact. This approach will prevent a false acceptance in which the scratches or other artifacts aligned, and may prevent a false rejection if a new transformation is found. Such method can be used alone or in combination with the artifact detection methods described herein. Such near-identity-transformation checking can be enabled or disabled based on the existence of detected artifacts in the probability or binary mask (for latency saving purposes).

As an example, in a matching scenario, such as in a fingerprint verification process, a new verification image may be acquired and compared with an enrollment template to determine whether the fingerprint matches the enrollment template. In one embodiment, when alignment between the new image and the enrollment template results in an identity transformation (or a near-identity transformation), the new image may be rejected (e.g., indicating a failed verification or non-match decision). In another embodiment, the new image may be processed to remove the features (e.g., ridges, minutiae, points, or other features), or portions of the images, that are consistent with the identity transformation or near-identity transformation, and then the new image without the removed features may be processed to determine an alignment with the enrollment template.

Alternative embodiments include implementations of the above methods for general camera systems or other perception sensors, not necessarily related to biometric recognition. The methods may be implemented both during the acquisition of the images, or as an off-line diagnosis tool to detect problems in a sensor.

A generalization of the near-identity-transformation method above includes checking how many possible transformations exist between two images, instead of just using the best one. If several different transformations are plausible, this might mean that there is a regular pattern, e.g., a grid, which may have been intentionally placed or scratched over the sensor's surface. In the event of multiple plausible transformations, in one embodiment, all of them should be discarded, rejecting the match. Note that this is very unlikely to happen with a fingerprint image or view.

It should be appreciated that the methodologies disclosed herein are applicable to different biometric sensing technologies, including different sensor coatings and materials. For example, the appearance of an artifact can differ between optical and capacitive sensor technologies. As an example, the artifacts may appear darker or lighter depending on the specific sensing technology. Accordingly, any threshold values for detecting an artifact may need to be adjusted and/or the number of images processed may need to be increased (or may be decreased) depending on the particular sensing technology used.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Certain embodiments are described herein. Variations of those embodiments may become apparent to those of ordinary skill in the art upon reading the foregoing description. The inventors expect skilled artisans to employ such variations as appropriate, and the inventors intend for the embodiments to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A method of detecting and managing a sensor artifact in a biometric sensor, the biometric sensor comprising an array of sensor locations, the method comprising:
   receiving a plurality of images from the biometric sensor, wherein each image is acquired by the biometric sensor in response to detection of an input object proximal to a sensing surface of the biometric sensor, wherein each image includes an array of pixel locations corresponding to the array of sensor locations;
   determining a pixel value for each pixel location in the array of pixel locations in each image of the plurality of images;
   determining one or more specific pixel locations in the array of pixel locations that have a pixel value having substantially the same bias in each of the plurality of images; and
   identifying an artifact pattern of the biometric sensor, wherein the artifact pattern includes sensor locations corresponding to the one or more specific pixel locations; and thereafter
   receiving a new image from the biometric sensor; and
   processing the one or more specific pixel locations of the new image corresponding to the one or more specific sensor locations of the artifact pattern differently than a remainder of the pixel locations of the new image.

2. The method of claim 1, wherein the pixel value for each pixel location in the array of pixel locations includes an intensity value, and wherein the identifying an artifact pattern includes:
   for each pixel location in the array of pixel locations, determining an average intensity value for the pixel location using the plurality of images; and
   identifying the artifact pattern based on the average intensity values of the pixel locations.

3. The method of claim 2, wherein the artifact pattern is identified as one or more first pixel locations having an average intensity value that exceeds a first threshold value, and one or more second pixel locations having an average intensity value that is less than a second threshold value.

4. The method of claim 3, wherein the first threshold value is greater than about 90% of a maximum intensity value, and the second threshold value is less than about 10% of the maximum intensity value.

5. The method of claim 2, further including re-determining the average intensity value using the new image and the plurality of images.

6. The method of claim 1, wherein the pixel value for each pixel location in the array of pixel locations includes a matching descriptor, and wherein the identifying an artifact pattern includes:
   determining a number of specific pixel locations in the array of pixel locations for which an identity transformation between two images in the plurality of images based on the matching descriptors is satisfied; and
   identifying the artifact pattern based on the number of specific pixel locations and coordinates of the specific pixel locations.

7. The method of claim 6, wherein the artifact pattern is identified as the specific pixel locations when the number of specific pixel locations is less than a first threshold value, and/or when the specific pixel locations are arranged in one or more clusters.

8. The method of claim 1, wherein the processing the one or more specific pixel locations of the new image differently than the remainder of the pixel locations of the new image includes ignoring the one or more specific pixel locations when processing the new image.

9. The method of claim 1, wherein the processing the one or more specific pixel locations of the new image differently than the remainder of the pixel locations of the new image includes discarding values of the one or more specific pixel locations and interpolating a new value for at least a subset of the one or more specific pixel locations based on pixel values of pixel locations adjacent to the one or more specific pixel locations.

10. The method of claim 9, wherein the interpolating includes applying an in-painting algorithm.

11. The method of claim 1, wherein the processing the one or more specific pixel locations of the new image differently than the remainder of the pixel locations of the new image includes generating a binary mask identifying the one or more specific pixel locations and applying the binary mask to the new image when processing the new image.

12. The method of claim 1, wherein the processing the one or more specific pixel locations of the new image differently than the remainder of the pixel locations of the new image includes generating a probability mask that identifies a probability value for the one or more specific pixel locations and for adjacent pixel locations within a range of the one or more specific pixel locations, and applying the probability map to the new image when processing the new image.

13. The method of claim 12, wherein the probability values change from a maximum value at the one or more specific pixel locations to reduced values for the adjacent pixel locations furthest from the one or more specific pixel locations.

14. The method of claim 1, wherein the artifact pattern corresponds to one of a scratch on an input surface of the biometric sensor and/or one or more inoperative sensor locations.

15. The method of claim 1, further comprising outputting an indication that an artifact pattern is present.

16. The method of claim 1, wherein the input object includes a fingerprint.

17. An electronic device for biometric recognition of a biometric input object, the electronic device comprising:
a biometric sensor, the biometric sensor comprising an array of sensor locations;
a memory for storing processing instructions; and
a processing system comprising one more processing elements, the processing system coupled to the memory and to the biometric sensor and configured execute the processing instructions to:
receive a plurality of images from the biometric sensor, wherein each image is acquired by the biometric sensor in response to sensing an input object proximal to an input surface of the biometric sensor, wherein each image includes an array of pixel locations corresponding to the array of sensor locations;
determine a pixel value for each pixel location in the array of pixel locations in each image of the plurality of images;
determine one or more specific pixel locations in the array of pixel locations that have a pixel value having substantially the same bias in the plurality of images; and
identify an artifact pattern of the biometric sensor, wherein the artifact pattern includes sensor locations corresponding to the one or more specific pixel locations; and thereafter
store a representation of the artifact pattern to the memory.

18. The electronic device of claim 17, wherein the processing system is further configured execute the processing instructions to:
receive a new image from the biometric sensor; and
process the one or more specific pixel locations of the new image corresponding to the one or more specific sensor locations of the artifact pattern differently than a remainder of the pixel locations of the new image.

19. The electronic device of claim 17, wherein the input object includes a finger, and each image corresponds to a portion of a fingerprint of the finger.

20. The electronic device of claim 17, wherein the pixel value for each pixel location in the array of pixel locations includes an intensity value, and wherein the instructions to identify an artifact pattern include instructions to:
for each pixel location in the array of pixel locations, determine an average intensity value for the pixel location using the plurality of images; and
identify the artifact pattern based on the average intensity values of the pixel locations.

21. The electronic device of claim 17, wherein the pixel value for each pixel location in the array of pixel locations includes a descriptor, and wherein the instructions to identify an artifact pattern include instructions to:
determine a number of specific pixel locations in the array of pixel locations for which an identity transformation between two images in the plurality of images based on the descriptors is satisfied; and
identify the artifact pattern in the plurality of images based on the number of specific pixel locations and coordinates of the specific pixel locations.

22. A non-transitory computer readable medium storing instructions for detecting and managing a sensor artifact in a biometric sensor, the biometric sensor comprising an array of sensor locations, wherein the instructions, when executed by a processing system, cause the processing system to:
receive a plurality of images from the biometric sensor, wherein each image is acquired by the biometric sensor in response to sensing an input object proximal to an input surface of the biometric sensor, wherein each image includes an array of pixel locations corresponding to the array of sensor locations;
determine a pixel value for each pixel location in the array of pixel locations in each image of the plurality of images;
determine one or more specific pixel locations in the array of pixel locations that have a pixel value having substantially the same bias in the plurality of images; and
identify an artifact pattern of the biometric sensor, wherein the artifact pattern includes sensor locations corresponding to the one or more specific pixel locations; and thereafter
store a representation of the artifact pattern to a memory.

23. The non-transitory computer readable medium of claim 22, wherein the instructions, when executed by a processing system, further cause the processing system to:
receive a new image from the biometric sensor; and
process the one or more specific pixel locations of the new image corresponding to the one or more specific sensor locations of the artifact pattern differently than a remainder of the pixel locations of the new image.

24. The non-transitory computer readable medium of claim 22, wherein the pixel value for each pixel location in the array of pixel locations includes an intensity value, and wherein the instructions to identify an artifact pattern include instructions to:
for each pixel location in the array of pixel locations, determine an average intensity value for the pixel location using the plurality of images;
identify the artifact pattern based on the average intensity values of the pixel locations.

25. The non-transitory computer readable medium of claim 22, wherein the pixel value for each pixel location in the array of pixel locations includes a descriptor, and wherein the instructions to identify an artifact pattern include instructions to:
determine a number of specific pixel locations in the array of pixel locations for which an identity transformation between two images in the plurality of images based on the descriptors is satisfied; and
identify the artifact pattern in the plurality of images based on the number of specific pixel locations and coordinates of the specific pixel locations.

26. The non-transitory computer readable medium of claim 22, wherein the input object includes a finger, and each image corresponds to a portion of a fingerprint of the finger.

* * * * *